UNITED STATES PATENT OFFICE.

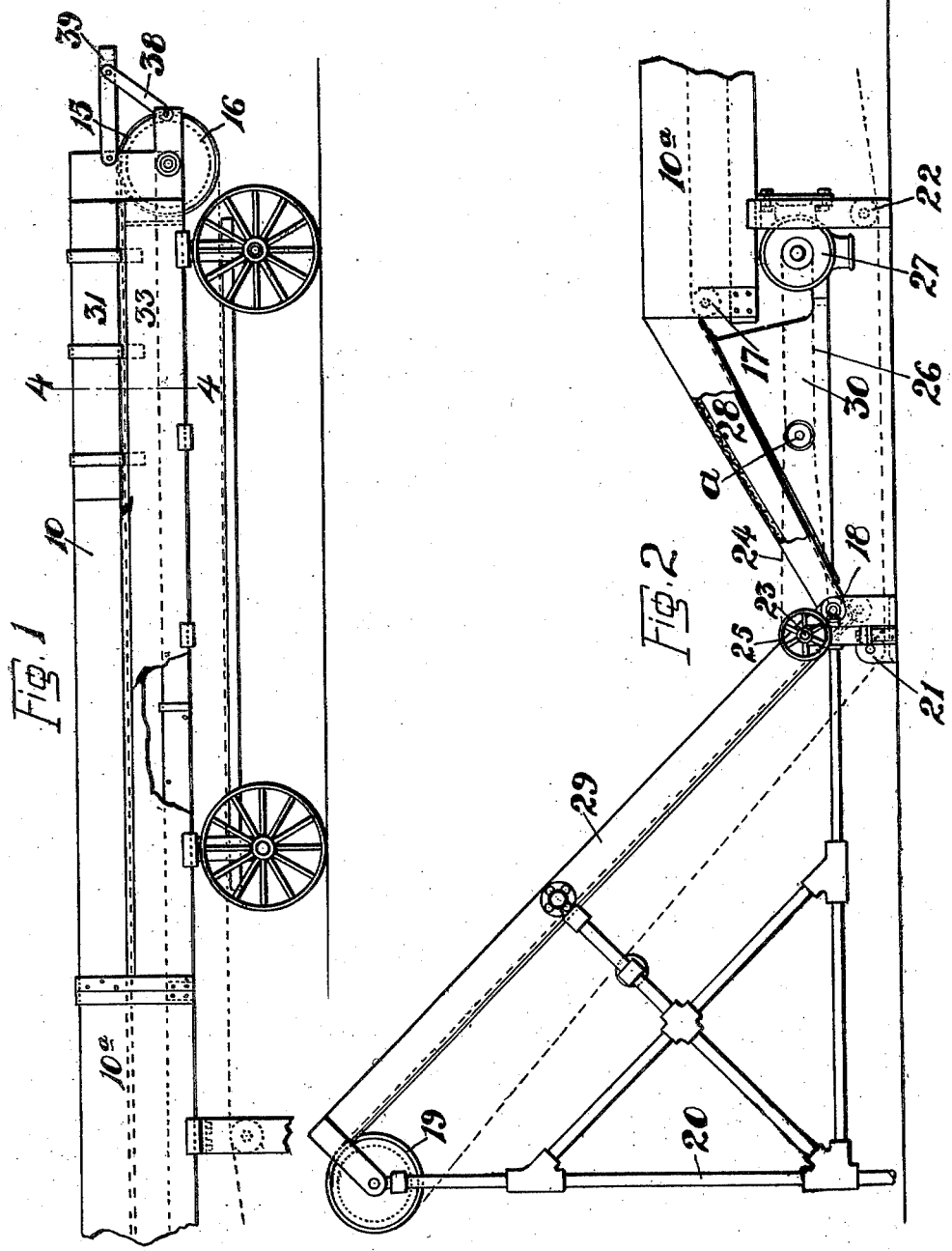

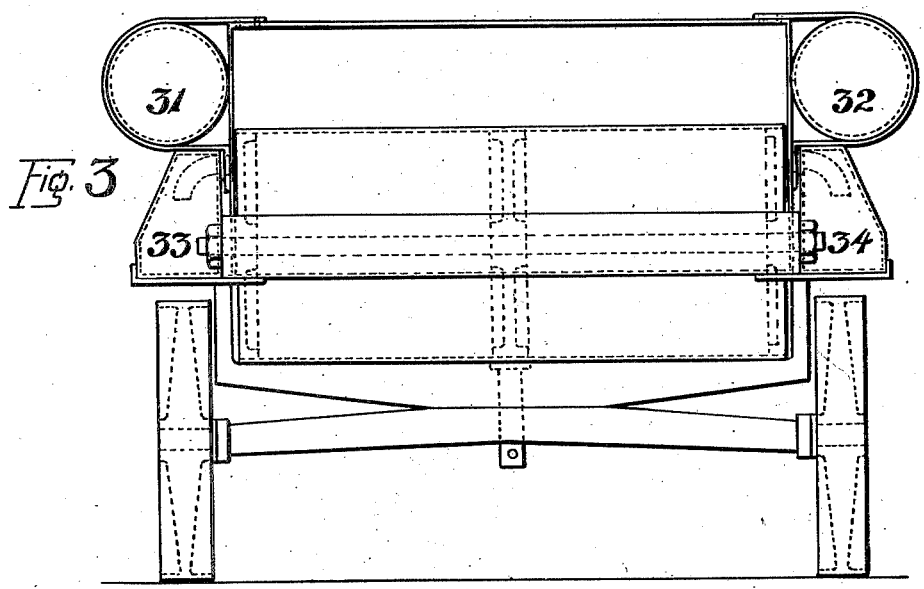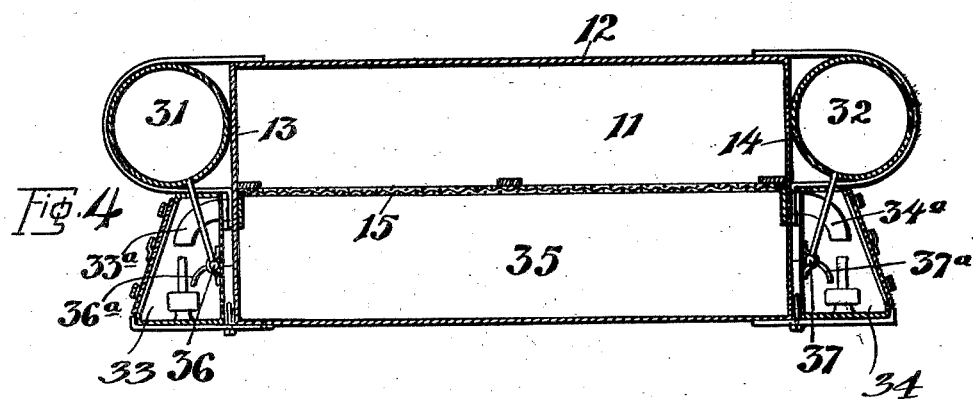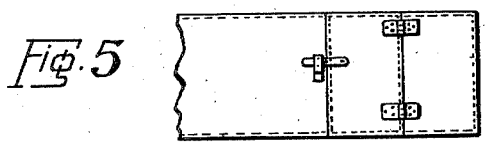

EDWARD J. RICHARDSON, OF WINDSOR, VERMONT, ASSIGNOR OF ONE-THIRD TO SAMUEL A. RICHARDSON, OF SPRINGFIELD, VERMONT.

APPARATUS FOR CURING, TRANSPORTING, AND STACKING HAY.

1,307,754.　　　　　Specification of Letters Patent.　　Patented June 24, 1919.

Application filed March 6, 1917. Serial No. 153,857.

*To all whom it may concern:*

Be it known that I, EDWARD J. RICHARDSON, a citizen of the United States, residing at Windsor, in the county of Windsor, in the State of Vermont, have invented a certain new and useful Improvement in Apparatus for Curing, Transporting, and Stacking Hay, of which the following is a specification, reference being had to the accompanying drawings.

The immediate object of this invention is to provide portable apparatus by means of which newly mown grass may rapidly be dried and effectively cured by artificial evaporation; said grass being handled automatically during the curing operation, and then discharged into a mow, or stacked, as may be required.

In the annexed drawings Figures 1 and 2 are side elevations of apparatus embodying my pres<sup>nt</sup> improvements; Fig. 1 showing mainly the drying and curing portion of the apparatus and Fig. 2 showing the carrier mechanism for receiving the cured hay and delivering it in a mow or upon a stack, as the case may be. Fig. 3 is an end elevation of the drying apparatus and Fig. 4 is a transverse, vertical, sectional, view taken on the line 4—4 of said Fig. 1.
Fig. 5 is a view of a portion of the side wall of the drier 10 showing particularly one of the doors leading into the lamp chamber.

Briefly described, my invention consists of a portable receptacle for the newly mown grass, in which receptacle is provided a slowly moving apron, or the like support for said grass, by means of which the grass is caused to travel through an artificially heated chamber, the dried and cured hay being then delivered to adjacent carrier devices by means of which it is automatically deposited in the mow or upon the stack, as already stated.
Referring to the drawings, the numeral 10 indicates a wagon-like receptacle which includes an elongated box-like chamber 11 having a closed top 12 and side walls 13—14, the bottom of said chamber consisting of an endless screened or perforated apron 15 which is supported upon a drum 16 at the front end, or entrance, to the chamber 11, the arrangement being such that the apron may be caused to travel slowly throughout the length of chamber 11 and thus carry forward through said chamber the grass deposited on the apron. At the other, or delivery, end of chamber 11 the apron is supported by an idle roller 17 and passes thence to and under an idle or guide roller 18 from which point it passes to and partially around a roll or drum 19 which is journaled in an elevated position in a stand 20. The apron 15 passes from the drum 19 downward to and under idle rollers 21—22 and thence to the drum 16 first above described. The apron thus provided is driven by means of any suitable power applied to a shaft $a$ which constitutes the prime mover of the entire apparatus, said shaft being connected by belt 24 and pulley 25 with the shaft 23 and also by a belt 26 with a blower 27 which is fixedly mounted underneath the drying chamber, as here illustrated.

A chute 28 extends from the delivery end of the drying chamber 11 to the point where roller 18 is located and a similar chute 29 extends from said point to the drum 19, these chutes serving as guards and guides to prevent the lateral escape of the hay from apron 15 as the hay is being carried from the heating chamber to the elevation of the drum 19.

The top of the chute 28 consists preferably of wire screen and the bottom of said chute is formed of perforated sheet metal, the said perforations connecting the chute with a chamber 30 which in turn is connected with the blower 27, the construction being such that, when the apparatus is in operation, a blast of cool air is forced into chamber 30 and passes thence upward through the perforated bottom of chute 28 and through the hay as the latter passes downward along the said chute.
In order to insure a long drying chamber I provide, preferably, an extension 10<sup>a</sup> which is separably bolted to the wheeled portion 10, as seen in Fig. 1 of the drawings.

Having thus described generally the construction of my newly improved apparatus I will now describe in detail the means provided for heating the chamber 11, referring now particularly to Figs. 4 and 5 of the drawings. Located at opposite sides of the chamber 11 are oil tanks 31—32 and immediately below the said tanks are what I term lamp banks 33 and 34 which are connected respectively, with a heating chamber 35 by means of pipes 33<sup>a</sup> and 34<sup>a</sup>. Lamps of any approved construction, and number, are located in the banks 33—34 said lamps being supplied with oil as needed, by means of pipes 36—37 which extend from end to end of the said banks and are connected with the oil-supply tanks 31—32; said pipes being provided with relatively smaller feeder or "drip" pipes 36ᵃ—37ᵃ. Supported by brackets 38, at the front end of the apparatus, is a feed table 39.

In the practical operation of my described apparatus (which it may be assumed, is located in a hay field) the grass in its green, or partly cured state if preferred, is placed upon the table 39 and is fed from said table into the chamber 11 and on to the slowly traveling screened apron 15. As the grass is carried forward by the said apron the heat from chamber 35 (which is connected directly with the lamp banks), passes upward through the screen and grass and thus hastens the drying and curing operation.

As the grass thus treated and cured leaves the chamber 11 and enters the chute 28 it is further dried, and cooled, by the constant blast of air from the chamber 30 and is then carried upward in the chute 29 and dumped over the drum 19.

Should it be desired to keep the grass in the heating and drying chamber 11 for a longer period of time, the extension 10ᵃ may be made correspondingly longer, or the speed at which the screen apron 15 travels may be reduced.

The apparatus is intentionally constructed in separable units in order that it may be conveniently separated and transported from place to place. By the aid of said apparatus it is both possible and practicable to treat green or partly cured grass quickly and effectively without regard to weather conditions.

Having thus described my invention, I claim as new and wish to secure by Letters Patent:—

1. The improvement in hay-curing apparatus, consisting of an elongated drying chamber, means for heating said chamber, a cooling chamber, an elevator, an endless screened carrier, and means for moving said carrier along the said drying and cooling chambers and elevator.

2. In combination in hay-curing apparatus, a curing chamber, a heating chamber, a screened traveling apron interposed between said chambers, and means for moving said apron.

3. In combination in hay-curing apparatus, two superposed chambers, a screened apron separating said chambers, means for moving said apron through the said chambers, and means for heating one of said chambers.

4. In combination in hay-curing apparatus, two superposed elongated chambers, a traveling screened apron between said chambers, and means for heating one of said chambers consisting of lateral lamp banks connected with the heating chamber and lamps located in the said banks.

5. In combination in hay-curing apparatus, two superposed elongated chambers, a traveling screened apron between said chambers, means for heating one of said chambers consisting of a plurality of lamps, a fuel supply piped to said lamps, a cooling chamber, and a blower connected with said cooling chamber.

EDWARD J. RICHARDSON.